United States Patent [19]

McPherson et al.

[11] Patent Number: 5,468,560
[45] Date of Patent: Nov. 21, 1995

[54] PRODUCT AND PROCESS FOR POLYMERIC ARTICLE WITH IMPROVED SURFACE

[75] Inventors: Mary C. McPherson, Orange County; Maria A. Hozbor, Santa Clara County, both of Calif.

[73] Assignee: The BOC Group, Inc., Murray Hill, N.J.

[21] Appl. No.: 230,025

[22] Filed: Apr. 19, 1994

[51] Int. Cl.$^6$ .................................................. B32B 27/38
[52] U.S. Cl. .................... 428/413; 428/412; 428/473.5; 428/500; 428/522; 428/938
[58] Field of Search .................................. 428/412, 413, 428/473.5, 500, 522, 938; 427/446

[56] References Cited

U.S. PATENT DOCUMENTS

| | | | |
|---|---|---|---|
| 4,072,769 | 2/1978 | Lidel | 204/165 |
| 4,302,307 | 11/1981 | Imada et al. | 204/169 |
| 4,310,564 | 1/1982 | Imada et al. | 427/40 |
| 5,152,879 | 10/1992 | Thurm et al. | 204/165 |

*Primary Examiner*—Edith Buffalow
*Attorney, Agent, or Firm*—David A. Draegert; Larry R. Cassett

[57] ABSTRACT

The surface characteristics of an article or substrate produced from a polymeric material, particularly a thermoplastic material, are modified by exposure of the surface to a low temperature plasma gas composition, wherein the gas composition consists essentially of $N_2O$ and $CO_2$. After exposure, the modified surface has improved adhesive strength to another similarly treated surface using an adhesive composition and improved receptivity for paint and other coatings.

13 Claims, 1 Drawing Sheet

*No solutions were available to measure surface energies lower than 28 dynes/cm

PRODUCT AND PROCESS FOR POLYMERIC ARTICLE WITH IMPROVED SURFACE

This invention relates to the treatment of polymeric surfaces and, more particularly, to a gas plasma process for changing the characteristics of a thermoplastic polymeric surface (e.g., to provide wettability, to enhance paint adhesion) without subjecting the surface to chemical, flame, or electrical oxidation and, optionally, without depositing films of other materials on the polymeric surface.

BACKGROUND OF THE INVENTION

There are many known methods for treating polymer surfaces to alter their properties, including those that involve flaming, corona discharge, chemical oxidation, electrode discharge processes, or plasma treatment in the presence of specific gases and chemical species, or various combinations of these processes. All of these known processes have certain limitations, including difficulty in maintaining quality control at desirable production speeds, deleterious effects on the polymer substrate, or ineffective or inadequate results with particular polymeric substrates. Chemical oxidations, for instance, are generally wet processes and, therefore, are relatively slow and have all the attendant problems connected with coating, cleaning and drying materials so treated. Flame treatments are also slow and often adversely affect the bulk properties of the material being treated, particularly if not very carefully controlled, and of course, they also present a constant fire hazard. Corona discharge treatments involving potential gradients across the material being treated often cause pinholes in the material and induced electrostatic charges which raise many problems for post-treatment handling. Electrode discharge systems are hard to maintain because, in the presence of organic materials, one of the typical effects of such discharges is the formation of polymeric films on the electrodes. Such discharge systems, therefore, require constant cleaning of electrodes to remove the polymeric film which acts as an insulator, thereby slowing the flow of the current. A simple and effective gas plasma treatment to improve paint adhesion is not readily available, especially for articles based on or coated with polyolefins, polycarbonate or polyvinyl chloride (PVC).

U.S. Pat. No. 4,072,769 (D. D. Lidel) refers to a previously known method in which polymeric surfaces are bathed in an atmosphere of nitrous oxide ($N_2O$) at elevated temperatures and in the presence of ultraviolet radiation. The result of this process is said to be similar to the flame, chemical and corona discharge processes referred to above, namely, the ultraviolet radiation breaks up other bonds as well as carbon-hydrogen bonds (even carbon-carbon bonds) causing relatively severe degradation of the surface of the polymer.

U.S. Pat. Nos. 4,072,769 and 3,761,299 disclose a process for modifying the surface characteristics of polymeric materials by exposure of the materials to a reactive gas which has been activated by radio frequency electromagnetic radiation prior to the gas being directed to the polymer surface. The references teach that the invention is based on the discovery that when certain specific activator gases, i.e., the noble gases and nitrogen, when activated by radio frequency electromagnetic radiation, produce free radical sites when brought into contact with polymer surfaces and also produce free radicals from the organic or inorganic vapors (e.g., water) introduced into the activator gas stream (the organic or inorganic vapors are referred to as reactive gases). When a gas stream combining both the activator gas and reactive gas are discharged onto a polymer surface, a reaction is reported to occur between the free radicals generated at the polymer surface by the activator gas and in the reactive gas by the activator gas to provide the desired result. Certain reactive gases are said to provide satisfactory results even in the absence of an activator gas. Excellent results are said to be obtained by using certain inorganic gases alone, namely, nitrogen trioxide ($N_2O_3$) and the "odd molecules" nitrogen oxide (NO) and nitrogen dioxide ($NO_2$). The reference suggests that similar results should be obtained using a reactive gas consisting of any other odd molecules (e.g., $ClO_2$, $O_2$, OF, etc.) which exist naturally with 3-electron bonds. In addition, water vapor alone produces satisfactory results. Alternatively, vapors of "many" organic compounds are said to be useful as the reactive gas, but only in combination with at least one of the activator gases prior to activation by the electromagnetic field.

The Lidel reference also refers to a prior art treatment for increasing the hydrophilicity of materials as disclosed by J. S. Hayward in U.S. Pat. No. 3,526,583. Lidel states that, according to the Hayward process, normally hydrophobic polymer surfaces can be rendered hydrophilic when bathed, in the presence of air, in a stream of an activated species of one of the noble gases, or of hydrogen, nitrogen, or oxygen (the latter gas being by far the least effective). It is said that the Hayward process indicates that activated gas species will attack polymer surfaces in a relatively gentle manner to cause some changes in the surface molecules.

Surface modification of polyethylene is utilized by another prior art process known as Casing-Crosslinking by Activated Species of Inert Gases (Chem. and Eng. News. Vol. 44, Sep. 26, 1966, pgs. 58 and 59, by Hanson et al.) which applies electronically excited species of inert gases (helium, argon, krypton, neon and xenon) to the surface to increase the cohesive strength of the surface molecules. The reference discussing the Casing process suggests that such activated gases do not necessarily change the wettability of the polymer surface for water, but that the activated gas attacks the surface of a polymer in a relatively gentle manner to form free radical sites. However, the reference states that Casing does not strengthen adhesive joints made with polypropylene and the evidence shows that both crosslinked and degraded polymer is formed at the surface, resulting in little change in cohesive strength of the surface region.

U.S. Pat. No. 4,276,138 to M. Asai et al. (the '138 patent) discloses a method for reducing static electricity on the surface of a shaped article made of PVC resins which comprises blending a surface active agent with the PVC resin prior to fabrication of the article and subjecting the article to treatment with a low temperature plasma gas. The incorporation of a surface active agent is critical to the invention. The gases include helium, neon, argon, nitrogen, nitrous oxide, nitrogen dioxide, oxygen, air, carbon monoxide, carbon dioxide, hydrogen, halogens, halogen compounds, olefins, halogenated hydrocarbons, aromatic hydrocarbons and heterocyclic organic compounds organosilanes. Inorganic gases are preferred, especially helium, argon, carbon monoxide, carbon dioxide, and hydrogen because of higher efficiency due to an unknown mechanism. When mixtures of gases are used (optionally), it is recommended that one of the components is carbon monoxide (CO).

U.S. Pat. No. 4,247,440 to M. Asai et al. discloses a method for preventing plasticizer bleeding on PVC shaped articles. The method requires the use of at least 20 parts of plasticizer per 100 parts of PVC which plasticizer must include at least 10% of a compound having at least one aromatic nucleus in a molecule (mixtures of plasticizers can be used). The low temperature plasma gases which are useful in the process include the same list of gases as in the '138 patent with the same preferences for inorganic gases and carbon monoxide. U.S. Pat. No. 4,272,464 to M. Asai et al. also deals with a method for preventing plasticizer bleeding, but it requires the blending of a urethane elastomer with the PVC resin prior to fabrication and plasma treatment. Again the same gases and preferred gases are disclosed as in the '138 patent.

Improved surface properties are said to be obtained with PVC articles according to U.S. Pat. No. 4,247,577 to K. Imada et al. when a covering layer of a curable organopolysiloxane composition is placed on the surface of the article after it is treated with a low temperature plasma gas. Suitable gases are helium, neon, argon, nitrogen, oxygen, air, nitrous oxide, nitrogen dioxide, carbon monoxide, carbon dioxide and hydrogen sulfide.

U.S. Pat. No. 4,302,307, also to K. Imada et al., discloses a treatment of PVC gramophone records in a low temperature plasma gas to improve antistatic properties. The gases are selected from inorganic or inert gases such as helium, neon, argon, nitrogen, nitrous oxide, nitrogen dioxide, oxygen, air, chlorine, hydrogen chloride,, carbon dioxide and hydrogen. It is reported that the gases can be used singly or in mixtures, but that argon or argon-containing mixed gas is preferred because of higher efficiency.

U.S. Pat. No. 4,315,808 to K. Imada et al. discloses a method for modifying the surface properties of shaped PVC articles with a low temperature plasma to prevent bleeding of plasticizer or other additive ingredients in the shaped article. The method requires intermittent exposure to the gas plasma (at least five exposure and repose times of specified duration) rather than continuous exposure. The list of useful gases is extensive, but limited to inorganic gases including helium, neon, argon, nitrogen, nitrous oxide, nitrogen dioxide, oxygen, air, carbon monoxide, carbon dioxide, hydrogen, chlorine, halogen compounds, such as hydrogen chloride, bromine cyanide and sulfur compounds, such as sulfur dioxide, and hydrogen sulfide. It is also suggested that gases may be used singly or in mixtures, but that the oxygen-containing compounds are less preferred, e.g., oxygen, air and nitrogen oxides, as well as halogen compounds and sulfur compounds.

U.S. Pat. No. 4,396,641 to K. Imada et al. discloses a method for improving the surface properties of shaped articles of synthetic resins which is said to be applicable to not only PVC, but to other kinds of synthetic resins including thermoplastic and thermosetting resins such as low- and high-density polyethylenes, polypropylenes, polystyrenes, etc. However the gaseous composition of the plasma atmosphere requires the presence of a specific organic silicon compound. Improved results are said to be obtained when the organic silicon compounded is diluted with an inert inorganic gas selected from nitrogen, nitrogen oxides and helium, argon, neon and xenon. Furthermore it is necessary that the plasma treated article be contacted with a halogen or a halogen containing inorganic or organic compound.

U.S. Pat. No. 4,337,768 teaches that it is well known that crosslinked thin layers on the surfaces of chlorine-containing vinyl polymers, such as PVC and polyvinylidene chloride, formed by glow discharge or UV radiation, act as barriers to migration of lower molecular weight substances such as monomers, plasticizers and additives to the surface. However the method disclosed in this reference includes a gas mixture for use in the "glow discharge" consisting of carbon monoxide (CO) and at least one different gas selected from the group consisting of argon, nitrogen, carbon dioxide, water, etc. A gas mixture of CO and $CF_4$ is characteristic. The use of a mixture of CO and $H_2O$ is especially preferred for producing film useful in blood bags. The modified surface layer is described as having a specified thickness, being crosslinked and having reduced chlorine content (45% or less) compared to the uncrosslinked portion.

Treatment of a fluorocarbon polymer with a gas plasma to improve surface adhesive properties (i.e., heat sealing) is disclosed in U.S. Pat. No. 4,735,996. However, two critical process elements are noted: (1) the power density of the plasma is preferably 0.03 to 10 W.sec/cm$^2$ in order to control the concentration of fluorine atoms on the surface of the polymer to within particular limits, and (2) the gas composition which is selected from Ar, $H_2$, CO, $CO_2$, $NH_3$, $SO_2$, HCl, freon gases such as $CF_4$, $H_2S$ and mixtures with other unspecified gases. However, the oxygen content of the gas has to be less than 10 mol %, or have a CO content of more than 10 mole %, or with an $NH_3$ content of more than 0.1 mole %.

U.S. Pat. No. 4,828,871 discloses that shaped polymer articles, for example, polypropylene films, can be made more receptive to organic coatings (such as pressure sensitive adhesives) by exposure of the article to an electrical discharge in the presence of a chlorocarbon or chlorofluorocarbon gas, thereby generating a chlorine-containing surface layer.

U.S. Pat. No. 5,152,879 discloses a process for the low pressure plasma treatment of polyolefin films using oxygen-containing gases, such as $O_2$, $H_2O_2$, $H_2O$, $N_2O$, $NO_2$ or $O_3$ and mixtures with noble gases such as He, Ne, Ar, Kr or Xe. The process is said to be particularly useful for preparing multilayer films. Important process parameters for improved bonding or adhesion of the film are reported to be (1) maintaining the energy density on a unit surface of polyolefin film at or above 0.01 or above 10 Ws/cm$^2$, (2) keeping the polyolefin film at a distance of at least 60 mm from the electrodes to which the electric field for the production of the plasma is applied and (3) maintaining the temperature of the film at or below 30° C. during the treatment, preferably from −2° C. to 10° C.

Plasma treatment of highly oriented polyolefins having an ultrahigh molecular weight to produce articles having good wetting and adhesion properties without reducing their tensile strength is carried out with inert and/or reactive gases or gas mixtures, the use of reactive gases being preferred. Suitable inert gases are nitrogen and helium, and suitable reactive gases include air, oxygen, carbon dioxide and ammonia. Preferably chemical treatment of the polyolefin is carried out immediately after plasma treatment to improve the wetting and adhesive properties of the plasma treated articles. Chemical treatment is proposed using various broad classes of reagents, including those with carboxyl groups, hydroxyl groups or carbonyl groups.

In an effort to improve the paintability of polyvinyl halide compositions, U.S. Pat. No. 5,198,303 teaches that a copolymer of vinyl halide (vinyl chloride) and an adhesion-promoting comonomer is used to produce a flexible or semi-rigid composition. The reference acknowledges that plasticizer migration in PVC polymers is an inherent limitation when good paint adhesion is required. Avoiding highly flexible PVC compositions permits the inventors to eliminate plasticizer from the composition, and copolymerizing with an adhesion promoting comonomer is said to further improve adhesion.

U.S. Pat. No. 5,169,675 describes a process for the bonding of high nitrile resins to the surface of plasma-treated plastics. The "plastics" (polybutadiene rubber is also disclosed) include polyethylene, polypropylene and PVC. The reactive gas plasma is disclosed as a single gas or combination of gases including water, hydrogen, oxygen, volatile non-polymerizing alcohols and non-polymerizing organic acids, most preferably oxygen, water or combinations thereof; but not including nitrogen or acetonitrile.

The use of cold gas plasma to treat polyolefins surfaces for improved paintability is described in articles by S. L. Kaplan, et al. ("Commercial Plasma Processes For Enhanced Paintability Of TPO Auto Fascia", "Successful TPO Painting-Cold Gas Plasma Advances Painting Application", and "Plasma Surface Treatment Of Plastics To Enhance Adhesion: An Overview"). These articles comprehensively describe the conditions and practical advantages of the plasma treatment process, and consequently reinforce the conclusion that the unique advance described in the present invention was missed by prior investigators.

However effective the referenced treatments are initially, with certain materials, such as (PVC), low density polyethylene (LDPE), linear low density polyethylene (LLDPE), polypropylene (PP) and other olefin polymers, the treatment's effectiveness deteriorates rapidly over time. This is especially true of polymers containing plasticizers, processing aids, internal lubricants, heat or UV stabilizers, or dispersion aids which can and tend to bleed (bloom, migrate) to the surface. This invention proves particularly effective for such classes of materials, which includes, but is not limited to, PVC, LDPE, LLDPE, PP and other polyolefin materials.

SUMMARY OF THE INVENTION

A process for modifying at least a portion of at least one surface of an article produced from a polymeric material, and the treated article obtained thereby, in order to improve the adhesion properties of the surface or to render the treated surface suitable for receiving and retaining all or substantial all of paint or other coating materials subsequently applied thereto. The process comprises exposing the surface to be modified to a low temperature plasma gas composition, wherein the gas composition consists essentially of a mixture of $N_2O$ and $CO_2$, for a time sufficient to modify said surface. The thus treated surface exhibits unexpected and unusual activity and stability important for further processing and use.

DETAILED DESCRIPTION OF THE INVENTION

Figure 1:
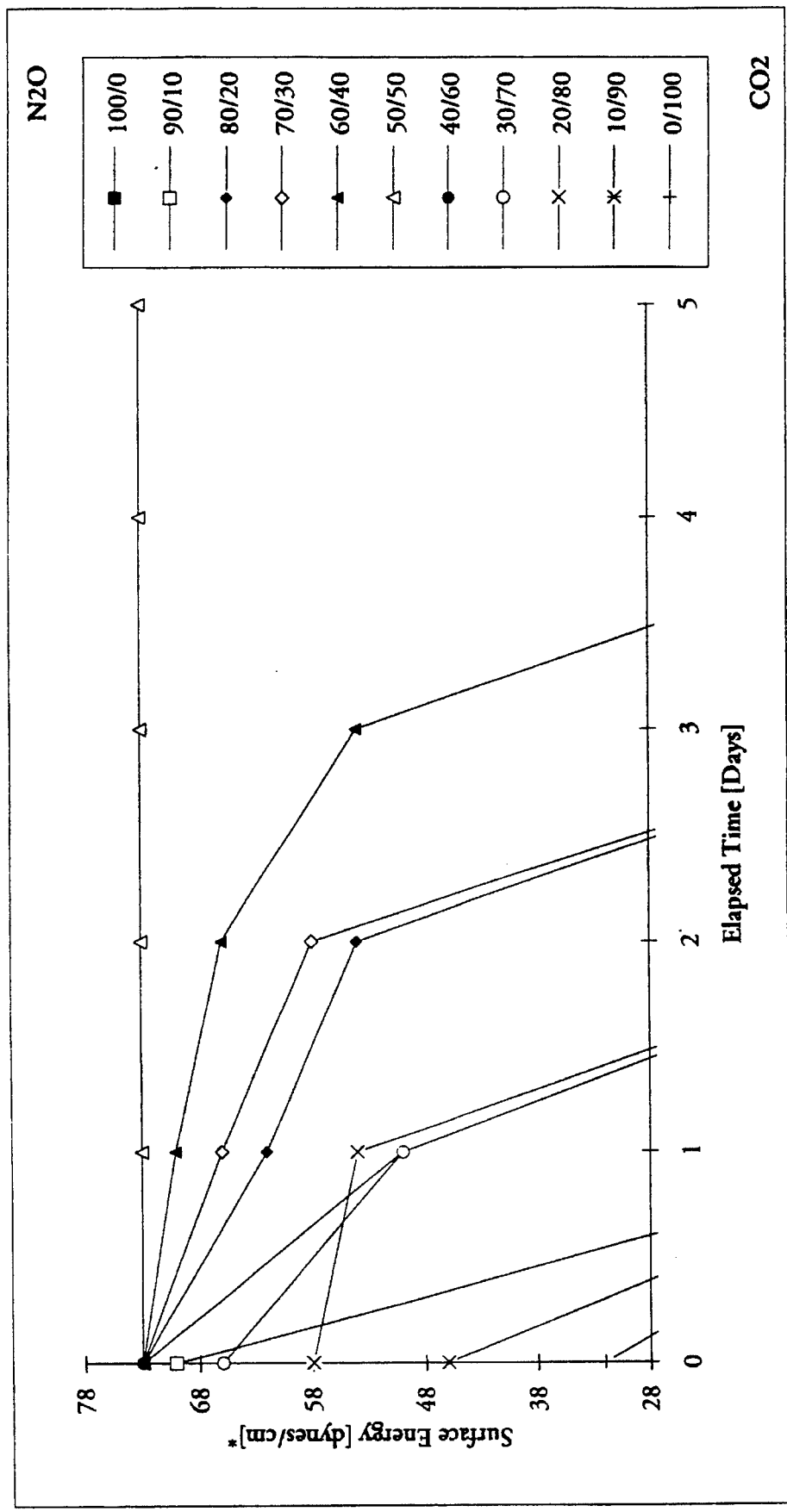
FIG. 1 is a plot of surface energy in dynes/cm with respect to elapsed time in days of nonwoven fabric, the surface of which was exposed to a low temperature plasma gas consisting of $N_2O$ or $CO_2O$ or mixtures thereof at different concentrations, as the case may be. The nonwoven fabric was manufactured from a propylene-ethylene copolymer having a 2.6% polymerized ethylene content (which copolymer was produced by and is commercially available from HIMONT U.S.A., Inc.) by the spun bonded process which is well known. The spun bonded process is illustrated in, for example, U.S. Pat. Nos. 4,340,563 and 3,692,618. The disclosures of these patents is incorporated herein by reference.

Achieving reliable paint adhesion to plastic surfaces such as thermoplastic olefins (TPOs), particularly those based on propylene polymers in general, polyvinyl halides, specifically PVC, polycarbonates and other polymers is a recurring need in the automotive and other industries. Generally, when painting olefin based plastics, adhesion promoters containing volatile organic compounds (VOCs) are used. The use of VOC containing compounds presents both health and environmental concerns. An alternative to VOC-containing adhesion promoters which is safe for both people and the environment is cold gas plasma, but obtaining improved adhesion levels and long term surface modification of PVC and propylene polymers materials are continuing objectives. These and other objectives are achieved by the present invention.

Plasma is often referred to as the fourth state of matter. When energy is applied to a solid, the solid can undergo a transition to the liquid state. If further energy is applied, the liquid becomes a gas. If additional energy of the proper kind is applied, the gas dissociates and becomes a plasma. Plasmas exist in a variety of forms. Most cosmic plasmas are of a very high energy and temperature (in excess of several thousand degrees Celsius) and consequently unusable in industry and with plastics in particular. By applying the appropriate type of energy and selecting an appropriate gas environment, one can create a plasma particularly useful with plastics.

For the treatment of plastics, the preferred plasma is a low pressure or vacuum process so the temperature is at or only slightly elevated above ambient, preventing thermal degradation of the plastic or thermal distortion of the molded article. Inside the plasma chamber where the polymer to be treated is present, active species in the form of electrons, free-radicals, and ions collide with the polymer surface, breaking molecular bonds and creating new functional groups on the polymer surface. Since the energy of the active species is not great enough to penetrate more than a few molecular layers of a polymer, only the surface is modified and the bulk properties of a material remain unchanged.

Without being limited by theory, it is believed that there are at least three competing molecular processes or reactions which are capable of altering the polymer simultaneously, leading to a complex result:

1. Ablation: the removal by evaporation of surface material and organic contaminants, also referred to as etching;
2. Crosslinking: the chemical connection of two or more polymer chains; and
3. Activation: the substitution of atoms in the polymer molecule with chemical groups from the plasma.

These reactions are affected by, and potentially controlled through, the gas chemistry and the process variables associated with a particular plasma treatment system. It is also known that plasma contains a very high-energy vacuum ultraviolet (UV) radiation. UV creates free radicals on the surface of the polymer which are identical in nature to radicals created by electron bombardment, and thus react in a similar manner to chemically modify the surface.

Plasma treatment system configuration also plays an important role in processing large size parts, or large quantities of smaller parts. Barrel type plasma systems generate a "secondary plasma" in that the actual glow discharge or "primary plasma" is generated between a cylindrical, mesh sleeve and the barrel wall. Since the part to be surface treated is usually placed on a stage in the center of the barrel, diffusion of constantly depleting active species are transported to the part. A secondary plasma system is therefore inefficient due to line-of-site shadowing of various radiation, such as UV, lack of uniformity due to a radial radio frequency (RF) field effect, and differing specie densities.

Preferred plasma systems for use in the present invention are the more technologically advanced, primary plasma systems which incorporate a parallel plate electrode design where parts to be treated are exposed directly to the primary field of RF energy. The subsequent primary plasma is particularly more uniform and more efficient since the part is exposed in all three dimensions to the glow discharge. With higher pressure processes (but still within the general definition of a cold gas plasma), some form of gas delivery system, designed to create a uniform laminar flow of process gas throughout the entire chamber volume is beneficial. In multiple electrode/shelf designs, it is important that each of the electrodes receive equal amounts of RF energy. In this manner a uniform glow discharge is created in between each shelf or in each plasma zone. Solid state components and microprocessor control of the systems parameters of process time, flow rate, power level, and working pressure, will also ensure process uniformity, efficiency, and repeatability.

Since plasmas are electrically conductive atmospheres, they carry a characteristic impedance to the output of the RF generator. Therefore, the preferred plasma process utilizes a matching network to constantly tune the plasma impedance to the output impedance of the RF generator. Advanced plasma systems suitable for use in the present invention are available from HIMONT Plasma Science, Foster City, California (a business unit of HIMONT U.S.A., Inc.), and incorporate an automatic matching type of network and provisions for error checking during a process.

The low temperature plasma is generated in a gaseous atmosphere at reduced pressure of from about 0.001 to about 10 Torr, preferably from about 0.01 to about 5 Torr, more preferably from about 0.05 to about 1.0 Torr, most preferably from about 0.125 to about 0.400 Torr. The electric power can be supplied to the equipment at a high frequency, from about 40 Khz to 3 Ghz, preferably from 13 to 27 Mhz, and most conveniently at 13.56 Mhz. To achieve the desired plasma condition in the gaseous atmosphere, the electric power delivered to the apparatus can vary over a range of from about 10 to 10,000 watts; preferably from about 50 to about 5,000 watts, more preferably from about 75 to about 1,000 watts, most preferably from about 200 to about 500 watts. The power used is somewhat dependent on chamber working volume. The most preferred 200 to 500 watts is appropriate for HIMONT Plasma Science PS0350 or PS0500 gas plasma apparatus with working volumes of 3.5 and 5.0 cubic feet, respectively. The plasma treatment time varies from a few seconds to several tens of minutes, preferably from about 20 seconds to about 30 minutes, most preferably from 20 seconds to about 7 minutes.

It should be appreciated that treatment pressure, time and power are interrelated, rather than independent, variables. The effect of the level selected for each of these variables will determine the extent of polymer surface modification; also related are the chamber volume and geometry as well as the sample size and surface geometry. The selection of the level for these variables is within the ordinary skill of practitioners in the art to which this invention pertains. This invention provides a particular and unique gas combination of $N_2O$ and $CO_2$ which when used to treat polymer surfaces according to this invention provides not only a modified polymer surface but one that is time-enduring.

The $N_2O/CO_2$ mixtures are effective from 80 to 40 mol % $N_2O$ with 20 to 60 mol % $CO_2$, preferably 70 to 45 mol % $N_2O$/30 to 55 mol % $CO_2$, most preferably from 60 to 45 mol % $N_2O$/40 to 55 mol % $CO_2$, where the amount of $N_2O$ and $CO_2$ in the mixture equals 100 mol %.

The plasma process is generally practiced as follows. The parts to be treated are placed into a vacuum chamber and the chamber pressure is reduced, typically to 0.05 Torr. The process gas mixture employed is introduced to the chamber and the chamber pressure stabilized at a pressure of 0.5–1.0 Torr. The interior dimensions of the work area is approximately 0.33×0.41×0.44 meters (width×height×depth) for a total working volume of 0.06 cubic meters. A suitable high frequency form of energy, typically 13.56 Mhz radio frequency energy, is used to create the plasma; in the system described this is achieved with a total power input capacity of 550 watts. The RF energy dissociates the gas, creating a plasma characterized by a distinctive glow. Since the process is conducted at reduced pressures, the bulk temperature of the gas is near ambient temperature, thus the reference to a cold gas plasma, a glow discharge, or a cold gas glow discharge. The electrons or ions created in the plasma bombard the polymer's surface, abstracting atoms or breaking bonds creating free radicals. These free radicals are unstable and seek to satisfy a more stable state by reacting with free radicals or groups within the plasma gas, also establishing new moieties on the surface of the polymer. In this manner the polymer surface can be molecularly re-engineered in a highly complex manner to provide a physical state and functional groups that enhance adhesion of the paint and other coating materials and provide reactive sites that can result in covalent chemical bonding of the paint to the polymer. The modified surface condition of the plastic and covalent bonds enhance the permanency and the adhesive tenacity of the paint or coating material to the polymer.

As described above, treating a polymer with plasma can increase its surface energy by modifying the surface chemistry. Greater surface energy offers the potential for greater chemical reactivity and compatibility to paints, inks and other coating materials. Enhanced surface reactivity is characterized in the laboratory by water wettability. Wettability describes the ability of a liquid to spread over and penetrate a surface, and can be measured by the contact angle between the liquid and the surface or by the use of reference liquids with known properties. The relationship between contact angle and surface energy is direct; contact angle decreases with surface energy.

Contact angle measurements are sometimes also used as a general indication of the presence of contaminants. The cleaner the surface, the lower the contact angle a water drop will make with the surface. For example, a surface contaminated with mold release agent will make a contact angle of 80° to 90°, indicating poor wettability; and silicones will form a contact angle greater than 90 degrees. Many clean metal surfaces show a contact angle of 30° to 70°. On the other hand, plasma-treated surfaces yield a contact angle 20° or less, suggesting reduced contamination and/or greater surface energy. It is appreciated that bonding in manufacturing processes, including paint adhesion, is a complex and specialized field, and although cleanliness and wettability are necessary for good adhesion, such conditions do not guarantee it. Plasma treatment is a complex chemical process and the results of the operation depend on the chemistry of the surface and the chemistry of the plasma. The resultant surface chemistry must be compatible with any bonding agents, including paints. Plasma treatment of the polymers of the present invention using the gas composition taught herein provides unexpected advantages in surface condition and paint and coating adhesion.

The polymers useful in the present invention are comprised of isotactic and sydiotactic propylene polymer materials, ethylene polymers, polyamides, polyesters, polystyrene, styrene copolymers containing 70% polymerized styrene units, polycarbonate, polyphenylene ether (PPE), and polyvinyl halide polymers generally and PVC in particular. Propylene polymer materials and ethylene polymers include homopolymers, copolymers and terpolymers with other alpha-olefin monomers and/or aliphatic diene monomers, and mixtures of such polymers.

Suitable propylene polymer materials include (I) homopolymers of propylene; and (II) random crystalline propylene copolymers, terpolymers or both, containing from about 80 to about 98.5% of propylene; preferably about 90 to about 95%, more preferably about 92 to about 94% of propylene; and from about 1.5 to about 20.0% of at least one comonomer selected from the group consisting of ethylene and $C_4$–$C_{10}$ alpha-olefins. When a $C_4$–$C_{10}$ alpha-olefin is not present, the copolymer preferably contains from about 2 to about 10% ethylene, more preferably from about 7 to about 9%. When a $C_4$–$C_{10}$ alpha-olefin is present, the terpolymer preferably contains from about 0.5 to about 5%, more preferably about 1 to about 3% ethylene and from about 2.5 to about 10.0%, preferably about 3 to about 7%, more preferably about 4.0 to about 6.0% of an olefin selected from the group consisting of $C_4$–$C_8$ alpha-olefins. Included also are mixtures of such copolymers and terpolymers, with or without polypropylene homopolymer.

Additionally useful propylene polymer materials are (III) heterophasic or impact-modified polyolefin compositions obtained by sequential copolymerization or mechanical blending of (I) or (II) with an elastomeric olefin copolymer or terpolymer fraction such as elastomeric ethylene-propylene, ethylene-butene-1, propylene-butene-1 copolymers, and ethylene-propylene-diene monomer terpolymers. Suitable heterophasic polyolefin compositions of this type include, for example, those described in European patent application EP A-416 379, and in European patent EP B-77 532.

Suitable heterophasic polyolefin compositions identified as (III), above, can comprise (by weight):

(a) 90–55 parts of polypropylene homopolymer having an isotactic index greater than 90, and/or a crystalline copolymer of propylene with ethylene and/or with an α-olefin of formula CH2=CHR, where R is a $C_2$–$C_6$ alkyl radical, containing less than 10% of ethylene and/or α-olefin, preferably from 0.5 to 9%, more preferably from 2 to 6% by weight, and (b) 10–70 parts, preferably 20–40, of an elastomeric copolymer of propylene with ethylene or with an α-olefin of formula CH2=CHR, where R is a $C_2$–$C_6$ alkyl radical or mixtures thereof, wherein the total of (a) and (b) is 100 parts.

The $C_4$–$C_{10}$ alpha-olefin is selected from the group consisting of linear and branched alpha-olefins such as, for example, 1-butene, isobutylene, 1-pentene, 1-hexene, 1-octene, 3-methyl-1-butene, 4-methyl-1-pentene, 3,4-dimethyl-1-butene and ethyl-1-hexene.

The propylene polymer materials described herein, including isotactic polypropylene, random copolymers and terpolymers of propylene and their mixtures, with or without polypropylene homopolymer and the heterophasic polymer compositions are available commercially from HIMONT U.S.A., Inc. and HIMONT Italia S.r.l.

Polyvinyl halide polymers useful in the present invention are well known, particularly PVC. It is produced commercially primarily as a homopolymer although copolymers are also useful. In copolymers vinyl chloride constitutes 50% by weight or more of the polymer, with one or more copolymerizable monomers selected from the group consisting of vinyl esters, such as vinyl acetate, vinyl ethers, acrylic acid and esters thereof, methacrylic acid and esters thereof, maleic acid and esters and anhydride thereof, fumaric acid and esters thereof, aromatic vinyl compounds, such as styrene, vinylidene halides, such as vinylidene chloride, acrylonitrile, methacrylonitrile and alpha-olefins, such as ethylene and propylene. Commercial PVC typically is produced by an addition polymerization process using a free radical formed by the decomposition of an initiator. Control of the polymerization temperature typically results in isothermal conditions which produces a polymer with a narrow molecular weight distribution. The polymer is partially crystalline (syndiotactic) with a significant amount of unsaturated chain ends, e.g., about 60% depending on the mode of termination. In addition, a small amount of chain branching (about 4%) can be present. PVC is susceptible to decomposition at temperatures as low as 100° C. and is sold commercially with thermal stabilizers.

PVC polymer is usually mixed or compounded with other materials to make a usable product. The flexible PVC products contain varying amounts of plasticizers whereas rigid products contain little or no plasticizers. Plasticizers vary in their compatibility with PVC and are used in various concentrations depending on that compatibility. Plasticizers are susceptible to migration, e.g., bleeding or blooming to the surface, and therefore can significantly affect the adhesion and paintability of the plasticized compound, thus making the advance of the present invention particularly valuable. Typical plasticizers useful in PVC compositions include esters of phthalic acid, such as dioctyl phthalate, dibutyl phthalate and butyl benzyl phthalate, esters of aliphatic dibasic acids, such as dioctyl adipate and dibutyl sebacate, glycol esters, such as esters of pentaerythritol and diethylene glycol dibenzoate, esters of aliphatic monocarboxylic acid, such as methyl acetylricinoate, esters of phosphoric acid, such as tricresyl phosphate and triphenyl phosphate, epoxidized oils, such as epoxidized soybean and linseed oil, esters of citric acid, such as acetyltributyl citrate and acetyltrioctyl citrate, trialkyl trimellitates, tetran-octyl pyromellitate and polypropylene adipate as well as other kinds of plasticizers including polyester-based plasticizers.

Other classes of additives which may be used in PVC compositions include heat resistance improvers, lubricants, stabilizers, fillers, antioxidants, ultraviolet absorbers, antistatic agents, antifogging agents, pigments, dyes, crosslinking agents, fusion promoters and lubricants for rigid PVC. In order to improve mechanical properties, e.g., impact strength, PVC polymers can be blended with other polymers, particularly elastomeric polymers, such as acrylonitrile-butadiene-styrene, urethane elastomers, ethylene-vinylacetate copolymers, acrylonitrile-butadiene copolymers, styrene-acrylonitrile copolymers, methyl methacrylate-butadiene copolymers, polyamide resins, polycaprolactams, epoxy modified polybutadiene resins and chlorinated polyethylene. When elastomeric polymers are used their concentration typically does not exceed about 50 parts by weight per 100 parts by weight of the vinyl chloride polymer.

The polymer materials may be in the form of molded articles of simple or complex shapes, films, sheets, laminates, or woven or nonwoven textiles. Complex shapes are those three-dimensional articles or structures wherein the dimension along the "z" axis is greater than or equal to 10% of the dimension along either the "x" or "y" axis in the surface of the plane, such as, for example, motor vehicle bumpers and fenders.

In one embodiment at least one of the polymer surfaces of the article treated according to this invention is coated with a paint composition. Typical paint compositions include acrylic enamel compositions comprising an alkyl acrylate polymer and a pigment and polyester based paint compositions containing a pigment. Such paint compositions are commercially available.

The painted articles of this invention exhibit good adhesion and permanence of adhesion between the paint composition and the treated surface of the article. Over extended periods of time of normal use, the painted surface retains its initial durability and is not degraded or modified by the plasma gas mixture treated polymer surface. Examples of suitable paint compositions include Industrial Refinishing Spray Paint Acrylic Enamel "Sprayon," 01510 OSHA Blue, 01800 OSHA White and 01770 OSHA Gloss Black, all available from Sprayon Products Industrial Supply, Division of Sherwin-Williams Company.

Conventional additives may be blended with the polymers used to produce the articles which can be treated according to this invention. Such additives include stabilizers, antioxidants, antislip agents, flame retardants, lubricants, fillers, coloring agents, antistatic agents and antisoiling agents.

The following examples are illustrative of this invention and are not meant as a limitation of the invention disclosed and claimed herein.

The mass flow controllers used in these examples were not calibrated specifically for either $N_2O$ or $CO_2$. Flow rates were calculated based on the specific heats of the respective gases. The accuracy of the mass flow controllers in these cases is ±5%.

EXAMPLE 1

Flexible PVC continuous film samples 0.020" thick and 36" wide from Davidson Rubber were treated in a Plasma Science PS0500 gas plasma reactor using the gas matrices shown in Table 1:

TABLE 1

| Gas | Flow Rate (SCCM*) | Power (watts) | Pressure (torr) | Time (minutes) |
|---|---|---|---|---|
| $N_2O$ | 320 | 500 | 0.250 | 6 |
| Argon (step 1) | 80 | 500 | 0.125 | 7 |
| $N_2O$ (step 2) | 320 | 500 | 0.250 | 6 |
| $N_2O/CO_2$ | 200/200 | 500 | 0.250 | 6 |
| $CO_2$ | 320 | 500 | 0.250 | 6 |

*SCCM = Standard $cc^3$/min.

The results are set forth in Table 1A below:

TABLE 1A

| Time (hours) | Surface Energy (dynes/cm) | | | |
|---|---|---|---|---|
| | $N_2O$ | Ar $N_2O$ | $N_2O/CO_2$ | $CO_2$ |
| as treated | 73 | 73 | 73 | 32 |
| 1 | 73 | 73 | 73 | — |
| 2 | 70 | 70 | 73 | |
| 3 | 70 | 70 | 73 | |
| 4 | 70 | 70 | 73 | |
| 5 | 70 | 70 | 73 | |
| 6 | 66 | 66 | 73 | |

TABLE 1A-continued

| Time (hours) | Surface Energy (dynes/cm) | | | |
|---|---|---|---|---|
| | $N_2O$ | Ar $N_2O$ | $N_2O/CO_2$ | $CO_2$ |
| 7 | 66 | 66 | 73 | |
| 8 | 66 | 62 | — | |
| 9 | 66 | 58 | — | |
| 23 | 42 | 38 | — | |
| 24 | 42 | 38 | 73 | |
| 25 | 42 | 38 | — | |
| 26 | 42 | 38 | — | |
| 27 | 38 | 38 | — | |
| 28 | 38 | 38 | — | |
| 29 | 38 | 38 | — | |
| 48 | — | — | 73 | |
| 168 | — | — | 73 | |
| 336 | — | — | 73 | |
| 528 | — | — | 73 | |

The above test results show that $CO_2$ alone is totally ineffective in providing a high energy surface to the article and that $N_2O$ alone is unable to provide a long lasting benefit.

Electron spectroscopy for chemical analysis (ESCA) data was obtained on the untreated PVC samples and on the 50/50 ratio, $N_2O/CO_2$ gas mixture-plasma treated PVC samples. The results are set forth in Table 1B below:

TABLE 1B

| | P | Cl | C | Cd | O | Ba | Zn | N |
|---|---|---|---|---|---|---|---|---|
| Untreated PVC | 0.4 | 11.0 | 79.0 | 0.8 | 9.2 | 0.2 | 0.2 | — |
| $N_2O/CO_2$ Treated PVC | 0.5 | 4.1 | 77.0 | 0.2 | 18.0 | — | — | 0.8 |

These results indicate that plasma $N_2O/CO_2$ gas mixture treatment has modified the sample surface at least by removing chlorine from the surface and incorporating oxygen moieties into the surface.

EXAMPLE 2

The same untreated PVC film as used in Example 1 was cut into 1×2 inch strips by 36" (0.020" thick) and plasma treated with a 50/50 molar ratio of $N_2O/CO_2$. The amount of gas was varied to effect chamber pressure but ratio of the gas mixture was held constant at 50/50 molar in 5 different runs of 2 strips per run as set forth in Table 2:

TABLE 2

| Run No. | Power (watts) | Pressure (Torr) | Time (minutes) |
|---|---|---|---|
| 1 | 100 | 0.250 | 3.5 |
| 2 | 500 | 0.250 | 6.0 |
| 3 | 500 | 0.250 | 1.0 |
| 4 | 300 | 0.400 | 6.0 |
| 5 | 300 | 0.100 | 6.0 |

After the plasma treatment, the samples were separated into two sets. The first set of samples were bonded immediately using 3M's 2216 epoxy adhesive and cure baked in accordance with the manufacturer's recommendations. The second set was bonded 120 days after the plasma treatment. The results are shown in Table 2A:

TABLE 2A

| Run No. | Same Day | Aged 120 Days |
| --- | --- | --- |
| 1 | Cohesive Failure | Adhesive Failure |
| 2 | Cohesive Failure | Cohesive Failure |
| 3 | Cohesive Failure | Adhesive Failure |
| 4 | Cohesive Failure | Cohesive Failure |
| 5 | Cohesive Failure | Cohesive Failure |

EXAMPLE 3

Black, blow-molded bottles, produced from Fina 7251 blow molding grade propylene-ethylene copolymer pigmented with 6 weight % black color concentrate, were treated in PS0500 gas plasma reactor using various gas plasma matices to investigate the enhancement of acrylic decorative ink adhesion as set forth in Table 3 below:

TABLE 3

| Run No. | Gas | Power (watts) | Pressure (torr) | Time (seconds) |
| --- | --- | --- | --- | --- |
| 1 | $N_2O$ | 200 | 400 | 60 |
| 2 | $O_2$ | 200 | 400 | 30 |
| 3 | $O_2/CF_4$ | 200 | 400 | 30 |
| 4 | Air | 200 | 400 | 30 |
| 5 | Argon | 200 | 400 | 30 |
| 6 | $N_2O/CO_2$* | 200 | 400 | 30 |

*50/50 mol ratio

*50/50 mol ratio

The improvement in adhesion was determined according to the ASTM D 3359-B tape pull test using 3M 810, 616, and 600 tapes on cross hatched specimens. The results are set forth in Table 3A below:

TABLE 3A

| Run No. | Results |
| --- | --- |
| 1 | 20% pass |
| 2 | 70% pass |
| 3 | 50% pass |
| 4 | 0% pass |
| 5 | 10% pass |
| 6 | 100% pass |

The above results show the unexpected and superior performance of the $N_2O/CO_2$ gas plasma.

EXAMPLE 4

To determine the sensitivity of the $N_2O$ and $CO_2$ alone and mixtures thereof at different concentrations, nonwoven fabric as described herein before was examined at 150 watts and 0,150 Torr. The results are shown in FIG. 1.

The expression "consisting essentially of" as used in this specification excludes unspecified ingredients which affect the basic and novel characteristics of the claimed invention.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A process for modifying of at least one surface of an article or substrate produced from a polymeric material comprising exposing said surface to be modified to a low temperature plasma gas composition in a chamber containing the article or substrate, wherein said gas composition consists essentially of a mixture of from 80 to 40 mol % $N_2O$ with 20 to 60 mol % $CO_2$ for a time sufficient to modify said surface.

2. The process of claim 1 wherein said polymeric material used to produce the article or substrate is selected from the group consisting of isotactic and sydiotactic propylene polymer materials, ethylene polymers, polyamides, polyesters, polystyrene, styrene copolymers containing 70% polymerized styrene units, polycarbonate, polyphenylene ether (PPE), polyvinyl halide polymers and propylene polymer materials impact-modified with an elastomeric olefin copolymer or terpolymer.

3. The process of claim 1 wherein said gas mixture is from 70 to 45 mol % $N_2O$ with 30 to 55 mol % $CO_2$.

4. The process of claim 2 wherein said gas mixture is from 70 to 45 mol % $N_2O$ with 30 to 55 mol % $CO_2$.

5. The process of claim 3 wherein said gas mixture is from 60 to 45 mol % $N_2O$ with 40 to 55 mol % $CO_2$.

6. The process of claim 4 wherein said gas mixture is from 60 to 45 mol % $N_2O$ with 40 to 55 mol % $CO_2$.

7. The process of claim 2 wherein the polymeric material is a propylene polymer material.

8. The process of claim 2 wherein the polymeric material is a polyvinyl chloride or polycarbonate.

9. An article produced by the process of claim 1.

10. An article produced by the process of claim 2.

11. The article produced by the process of claim 8 wherein the polymeric material is polyvinyl chloride in which the modified surface has a chlorine content of about 63% less and an oxygen content of about 196% more with respect to said surface prior to the plasma gas treatment.

12. The article of claim 9 wherein said at least one modified surface is adhered using an adhesive composition to the modified surface of second article treated in the same manner.

13. The article of claim 12 wherein said adhesive composition is an epoxy adhesive.

* * * * *